(12) United States Patent
Nam et al.

(10) Patent No.: US 7,588,625 B2
(45) Date of Patent: Sep. 15, 2009

(54) APPARATUS FOR MANUFACTURING MOLTEN IRONS TO DRY AND CONVEY IRON ORES AND ADDITIVES AND MANUFACTURING METHOD USING THE SAME

(75) Inventors: Kung-Won Nam, Pohang (KR); Min-Young Cho, Pohang (KR); Young-Chae Jung, Pohang (KR); Young-Jae Jang, Pohang (KR); Franz Hauzenberger, Linz (AT)

(73) Assignees: Posco, Pohang-shi (KR); Research Institute of Industrial Science & Technology, Pohang (KR); Voest-Alpine Industrieanlagenbau GmbH & Co., Linz (AT)

( * ) Notice: Subject to any disclaimer, the term of this patent is extended or adjusted under 35 U.S.C. 154(b) by 475 days.

(21) Appl. No.: 10/540,357

(22) PCT Filed: Dec. 23, 2003

(86) PCT No.: PCT/KR03/02814

§ 371 (c)(1),
(2), (4) Date: Jun. 23, 2005

(87) PCT Pub. No.: WO2004/057037

PCT Pub. Date: Jul. 8, 2004

(65) Prior Publication Data
US 2006/0119022 A1 Jun. 8, 2006

(30) Foreign Application Priority Data
Dec. 23, 2002 (KR) .................. 10-2002-0082630

(51) Int. Cl.
*C21B 13/02* (2006.01)
(52) U.S. Cl. ............................ 75/446; 75/450; 75/454
(58) Field of Classification Search .............. 75/494, 75/495, 499, 445, 448
See application file for complete search history.

(56) References Cited

U.S. PATENT DOCUMENTS
3,876,419 A * 4/1975 Brusov et al. ............... 75/452
(Continued)

FOREIGN PATENT DOCUMENTS
CA 2 259 681 1/1998
(Continued)

OTHER PUBLICATIONS
Canadian Office Action for Application No. 2,511,729, dated Jun. 29, 2007.
(Continued)

*Primary Examiner*—George Wyszomierski
*Assistant Examiner*—Tima M McGuthry-Banks
(74) *Attorney, Agent, or Firm*—Marshall, Gerstein & Borun LLP

(57) ABSTRACT

The invention relates to an apparatus and method for manufacturing molten irons. The method for manufacturing molten irons includes providing a mixture containing iron by drying and mixing iron ores and additives, passing the mixture containing iron through one or more successively-connected fluidized beds to convert the mixture into a reducing material that is reduced and calcined, forming a coal packed bed, which is a heat source in which the reducing material has been melted, charging the reducing material to the coal packed bed and supplying oxygen to the coal packed bed to manufacture molten irons, and supplying reducing gas exhausted from the coal packed bed to the fluidized bed. In the providing a mixture containing iron, exhaust gas exhausted from the fluidized bed is branched to dry at least one of the iron ores and the additives. The apparatus for manufacturing molten irons uses this method for manufacturing molten irons. Through the use of the invention, at least one of iron ores and additives is dried and conveyed to thereby enhance energy efficiency and minimize the amount of required equipment.

8 Claims, 2 Drawing Sheets

U.S. PATENT DOCUMENTS

| | | | | |
|---|---|---|---|---|
| 4,886,246 A | * | 12/1989 | Maeda et al. | 266/157 |
| 5,192,486 A | | 3/1993 | Whipp | 266/156 |
| 5,229,064 A | * | 7/1993 | Kanetsuna et al. | 266/172 |
| 5,354,356 A | | 10/1994 | Greenwalt | 75/445 |
| 5,584,910 A | * | 12/1996 | Kepplinger et al. | 75/445 |
| 6,110,413 A | * | 8/2000 | Jung et al. | 266/172 |

FOREIGN PATENT DOCUMENTS

| | | |
|---|---|---|
| CA | 2 184 009 | 5/2000 |
| JP | 61288004 A * | 12/1986 |
| JP | 62227020 A * | 10/1987 |
| JP | 61-202084 | 3/1988 |
| JP | 01-205019 | 8/1989 |
| JP | 10-356790 | 1/2000 |
| WO | WO 00/34531 | 6/2000 |

OTHER PUBLICATIONS

International Preliminary Examination Report in PCT/KR2003/002814 dated Mar. 31, 2005.

International Search Report in PCT/KR2003/002814 dated Mar. 26, 2004.

* cited by examiner

APPARATUS FOR MANUFACTURING MOLTEN IRONS TO DRY AND CONVEY IRON ORES AND ADDITIVES AND MANUFACTURING METHOD USING THE SAME

BACKGROUND OF THE INVENTION (a) Field of the Invention

The invention relates to an apparatus and method for manufacturing molten irons, and more particularly, to an apparatus and method for manufacturing molten irons in which iron ores and additives are dried while being conveyed, and then by the sensible heat of exhaust gas of a fluidized-bed reactors, the iron ores and additives are charged to the fluidized-bed reactors to thereby manufacture molten irons.

(b) Description of the Related Art

The iron and steel industry is a core industry that supplies the basic materials needed in construction and in the manufacture of automobiles, ships, home appliances, and many of the other products we use. It is also an industry with one of the longest histories that has progressed together with humanity. In an iron foundry, which plays a pivotal roll in the iron and steel industry, after molten irons (i.e., pig iron in a molten state) are produced using iron ores and coals as raw materials, steel is produced from the molten irons then supplied to customers.

Approximately 60% of the world's iron production is realized using the blast furnace method developed in the $14^{th}$ century. In the blast furnace method, coke produced using as raw materials iron ores and bituminous coal that have undergone a sintering process are placed in a blast furnace, and oxygen is supplied to the furnace to reduce the iron ores to iron to thereby manufacture molten irons. The blast furnace method, which is a main aspect of molten irons production, requires raw materials having a hardness of at least a predetermined level and grain size that can ensure ventilation in the furnace. Coke in which a specific raw coal that has undergone processing is needed as a carbon source used as fuel and a reducing agent. Also, sintered ore that has undergone a successive compacting process is needed as an iron source. Accordingly, in the modern blast furnace method, it is necessary to include raw material preparation and processing equipment such as coke manufacturing equipment and sintering equipment. Therefore, not only is it necessary to obtain accessory equipment in addition to the blast furnace, but equipment to prevent and minimize the generation of pollution in the accessory equipment is needed. The amount of investment, therefore, is considerable, ultimately increasing manufacturing costs.

In order to solve these problems of the blast furnace method, significant effort is being put forth in iron foundries all over the world to develop a smelting reduction process that produces molten irons by directly using fine coal as fuel and a reducing agent, and also directly using fine ores, which make up over 80% of the world's ore production, as an iron source.

The smelting reduction process typically uses a two-stage process of preliminary reduction and final reduction. The conventional molten iron manufacturing apparatus includes a fluidized-bed reactor that forms fluidized beds, and a melter-gasifier that forms coal packed bed and that is connected thereto. Iron ores and additives at room temperature are charged in the fluidized-bed reactor to undergo preliminary reduction. Since high-temperature reduced gas is supplied from the melter-gasifier to the fluidized-bed reactor, the iron ores and additives increase in temperature as a result of making contact with the high-temperature reduced gas. At the same time, 90% or more of the iron ores and additives at room temperature are reduced, and 30% or more of the same are calcined and charged to the melter-gasifier.

Coal is supplied to the melter-gasifier to form a coal packed bed, and the iron ores and additives at room temperature undergo smelting and slagging in the coal packed bed to be discharged as molten irons and slag. Oxygen is supplied through a plurality of tuyeres installed to an outer wall of the melter-gasifier such that the coal packed bed is burned and then the oxygen is converted into high temperature reduced gas, after which the high temperature reduced gas is supplied to the fluidized-bed reactor. Following reduction of the iron ores and additives at room temperature, they are exhausted outside. A temperature of the emitted exhaust gas is approximately 680° C., and a pressure thereof is 1.7~2.5 bar.

In the case where iron ores are charged to the fluidized-bed reactor for reduction into reduced iron, in order to prevent the reduced iron from sticking to the fluidized-bed reactor and in order to prevent thermal loss in the melter-gasifier, additives such as limestone and dolomite are charged to the fluidized-bed reactor together with the iron ores. The additives are typically around 15~20% of the total amount of the charged material.

Prior to charging the iron ores and additives to the fluidized-bed reactor, the iron ores and additives are dried in a drying apparatus to thereby ensure the free flow of these materials in the fluidized-bed reactor. To perform this operation, hot air is supplied to the drying apparatus to dry the iron ores and the additives. Since the iron ores makes up 80% or more of the combination with the additives, overall operating conditions are determined based on the requirements of the iron ore. However, because the additives have a grain size and density that are less than that of the iron ore, a significant amount of loss of the additives with a small grain size occurs if dried under the same conditions as the iron ore. Further, the drying apparatus frequently malfunctions since a substantial load is given to the same in order to realize favorable drying. Finally, 50% or more of the iron ores become fine ore of 1 mm or less to thereby clog the drying apparatus, thereby necessitating frequent production stoppages.

SUMMARY OF THE INVENTION

The invention has been made in an effort to solve the above problems. The invention provides an apparatus and method for manufacturing molten irons in which exhaust gas of a fluidized-bed reactor is used as conveying gas for conveying iron ores and additives, and, at the same time, its sensible heat is used to dry the iron ores and the additives such that costs associated with drying are reduced.

A method for manufacturing molten irons includes the steps of providing a mixture containing iron by drying and mixing iron ores and additives; passing the mixture containing iron through one or more successively-connected fluidized beds to convert the mixture into a reducing material that is reduced and calcined; forming a coal packed bed, which is a heat source in which the reducing material has been melted; charging the reducing material to the coal packed bed and supplying oxygen to the coal packed bed to manufacture molten irons; and supplying reducing gas exhausted from the coal packed bed to the fluidized bed. In the step of providing a mixture containing iron, exhaust gas exhausted from the fluidized bed is branched to dry at least one of the iron ores and the additives.

In the step of providing a mixture containing iron, at least one of the iron ores and the additives may be dried immediately prior to supply to the fluidized bed.

The step of providing a mixture containing iron may include discharging stored iron ores and additives; drying the iron ores and additives using separate heating air while vibrating the same; storing the dried iron ores and additives; and supplying the stored iron ores and additives to the fluidized bed.

Preferably, in the step of providing a mixture containing iron, an amount of branched exhaust gas is 20~40% of an amount of exhaust gas exhausted from the fluidized bed.

Preferably, in the step of providing a mixture containing iron, at least one of the iron ores and the additives is conveyed and simultaneously dried.

Further, in the step of providing a mixture containing iron, a flow rate of exhaust gas is preferably 20~30 m/s in the case where the iron ores are conveyed, and a flow rate of exhaust gas is preferably 10~20 m/s in the case where additives are conveyed.

Preferably, in the step of providing a mixture containing iron, the iron ores are fine ores having a grain size of 8 mm or less.

The apparatus for manufacturing iron includes a conveying line for drying and conveying iron ores and additives; one or more fluidized-bed reactors that reduce and calcine the iron ores and additives supplied from the conveying line to perform conversion into reducing material; a melter-gasifier for charging the reducing material and receiving the supply of oxygen to manufacture iron; a reducing gas supply line for supplying reducing gas exhausted from the melter-gasifier to the fluidized-bed reactors; and a exhaust gas branch line for branching exhaust gas exhausted from the fluidized-bed reactors and supplying the same to the conveying line.

The apparatus may further include a hopper for each of the iron ores and the additives; and a bypass line connected to the hoppers and supplying the iron ores and additives to the conveying line.

The apparatus may further include a drying assembly for drying the iron ores and additives supplied to the hopper; a storage bin connected to the drying assembly and for storing the dried iron ores and additive; and a conveyor belt connected to the storage bin and providing the iron ores and additives to the fluidized-bed reactors.

Preferably, the conveying line is extended vertically, exhaust gas is supplied to a lower port of the conveying line, and the iron ores and additives are supplied to the conveying line at a position 1~2 m higher than the supply position of the conveying line.

Preferably, a flow speed of the exhaust gas in the conveying line is 10~30 m/s.

Preferably, an amount of branched exhaust gas is 20~40% of an amount of exhaust gas exhausted from the fluidized-bed reactors.

Further, the iron ores are preferably fine ores having a grain size of 8 mm or less.

DETAILED DESCRIPTION OF THE PREFERRED EMBODIMENTS

Preferred embodiments of the invention will now be described in detail with reference to the accompanying drawings. It should be clearly understood that many variations and/or modifications of the basic inventive concepts may appear to those skilled in the present art. The embodiments are to be regarded as illustrative in nature, and not restrictive.

Figure 1:
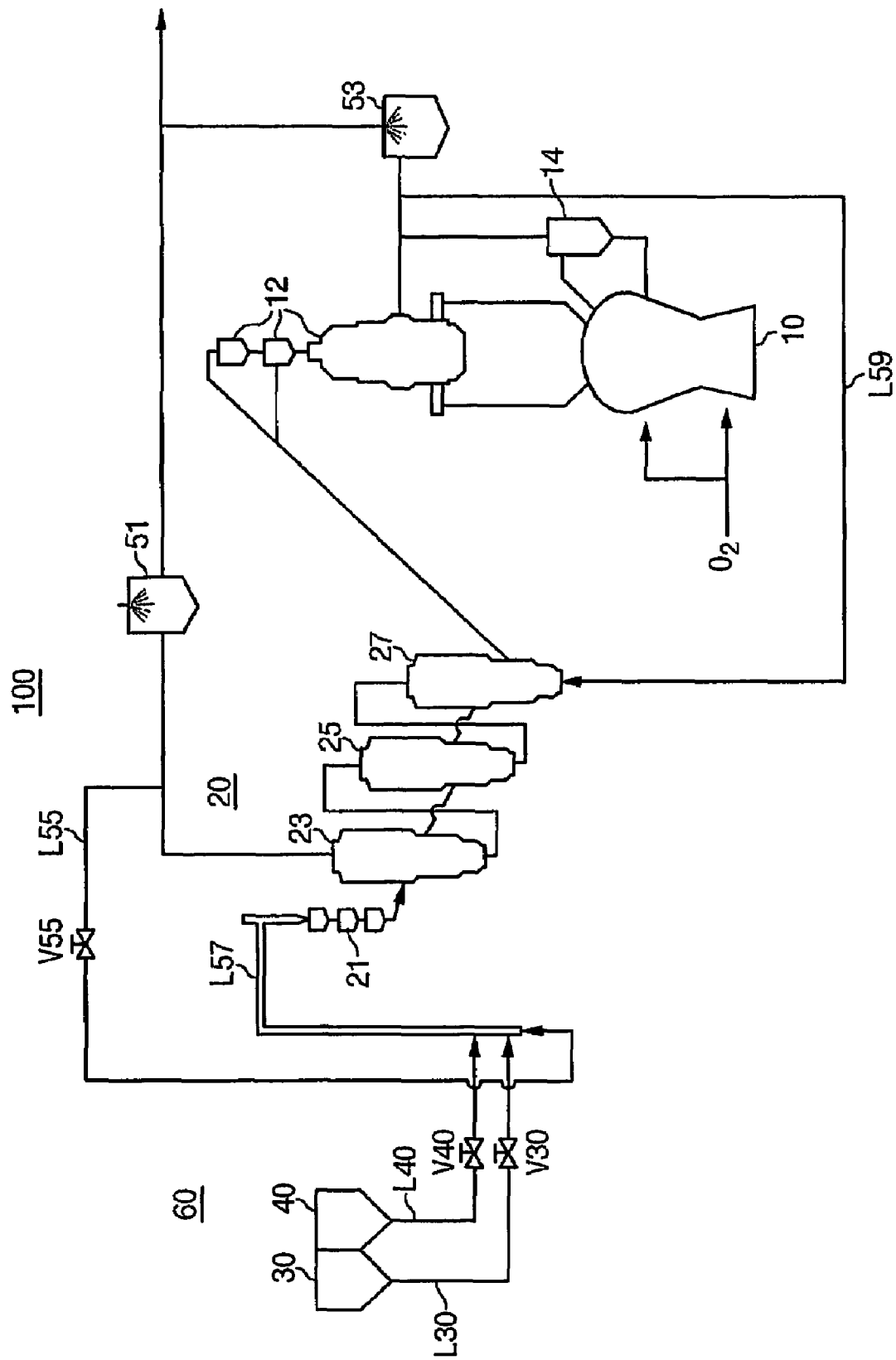
FIG. 1 is a schematic view of an apparatus for manufacturing molten irons according to a first embodiment of the invention.

FIG. 1 is a schematic view of an apparatus for manufacturing molten irons according to an embodiment of the invention. The apparatus dries and conveys iron ores and additives, and supplies the same to a fluidized-bed reactor.

An apparatus 100 for manufacturing molten irons according to a first embodiment of the invention includes the main elements of a fluidized-bed reactor unit 20, a melter-gasifier 10, a raw material supplying unit 60, and other accessory equipments. The fluidized-bed reactor unit 20 includes one or more fluidized-bed reactors having a fluidized bed therein, and acts to reduce and calcine iron ores and additives to reduced material. The reduced material is charged to the melter-gasifier 10, which includes a coal packed bed therein, and oxygen is supplied to the melter-gasifier 10 to thereby produced molten irons. Reduced gas exhausted from the melter-gasifier 10 is used to reduce and calcine iron ores and additives through a fluidized-bed reactor, after which the reduced gas is exhausted to the outside.

Elements included in the apparatus for manufacturing molten irons will now be described in more detail.

The fluidized-bed reactor unit 20 includes a rock hopper 21 that is charged with an iron-containing compound in which dry iron ores and additives are mixed, and one or more fluidized-bed reactors having a fluidized bed therein. An intermediate charge means is provided in the rock hopper 21 shown in FIG. 1, and allows for iron ores and additives to be charged to the fluidized-bed reactor that is maintained at a pressure from a normal pressure to 1.5~3.0 atmospheres.

The fluidized-bed reactors include a pre-heating reactor 23 for pre-heating the charged iron-containing compound, a preliminary reducing reactor 25 for performing preliminary reduction of the iron-containing compound pre-heated in the pre-heating reactor 23, and a final reducing reactor 27 for performing final reduction of the iron-containing compound that is reduced in the preliminary reducing reactor 25. In FIG. 1, although the fluidized-bed reactors are shown to include three stages, such a configuration is for illustrative purposes and the invention is not limited in this regard. Accordingly, a variety of different numbers of stages may be used for the fluidized-bed reactors. The iron ores and additives supplied to the fluidized-bed reactors forming a fluidized bed by contacting a high temperature reduced gas current therewith, and it is converted into a high temperature reduced material that is at a temperature of 80° C. or more, is 80% or more reduced, and is 30% or more calcined.

Although not shown in FIG. 1, to prevent scattering loss when reduced material discharged from the fluidized-bed reactors is directly charged to the melter-gasifier 10, a hot compacting apparatus may be mounted between these elements. Further, a hot intermediate vessel 12 is provided for supplying the reduced material discharged from the fluidized-bed reactors to the melter-gasifier 10 to thereby make supply of the reduced material to the melter-gasifier 10 easy.

Lump coal or shaped coal realized by pressing fine coal is supplied to the melter-gasifier 10 to form a coal packed bed. The lump coal or shaped coal supplied to the melter-gasifier 10 is gasified by a pyrolysis reaction at an upper area of the coal packed bed and by a combustion reaction by oxygen at a lower area of the coal packed bed. Hot reduced gas generated in the melter-gasifier 10 by the gasified reaction is supplied in succession to the fluidized-bed reactors through a reduced gas supply line L59, which is connected to a rear end of the final reducing reactor 27, to be used as a reducing agent and fluidized gas.

A dome-shaped empty space is formed to an area above a coal packed bed of the melter-gasifier 10. The flow rate of gas is reduced by the empty space such that large amounts of fine powder included in the charged reduced material and fine powder generated as a result of an abrupt increase in temperature of coal charged in the melter-gasifier 10 are prevented from being discharged out of the melter-gasifier 10. Further, such a configuration allows for absorbing of variations in pressure in the melter-gasifier 10 caused by irregular changes in the amount of gas generated as a result of directly using coal. The coal is gasified and removes volatile members therein while dropping to the bottom of the coal packed bed, and is ultimately burned as a result of oxygen supplied through tuyeres at the bottom of the melter-gasifier. The generated combustion gas raises through the coal packed bed, and is converted into high temperature reduced gas and exhausted to outside the melter-gasifier 10. Part of the combustion gas is scrubbed and cooled while passing through water collecting devices 51 and 53 such that pressure applied to the melter-gasifier 10 is maintained within the range of 3.0~3.5 atmospheres.

A cyclone 14 collects exhaust gas generated in the melter-gasifier 10 such that dust is again supplied to the melter-gasifier 10, and gas is supplied as reduced gas to the fluidized-bed reactors through the reduced gas supply line L59.

Reduced iron drops to the bottom of the coal packed bed together with the coal to undergo final reduction and smelting by combustion gas and combustion heat generated by gasifying and combusting coal, after which the iron is exhausted to the outside.

The raw material supplying unit 60 that uses the exhaust gas exhausted from the fluidized-bed reactors includes an iron ore hopper 30, an additive hopper 40, and a conveying line L57, and acts to dry and convey iron ores and additives to the fluidized-bed reactor unit 20. Iron ores and additives discharged respectively from the iron ore hopper 30 and the additive hopper 40 are supplied to the rock hopper 21 through the conveying line L57 connected to an iron ores supply line L30 and an additive supply line L40. Among the fluidized-bed reactors, part of the exhaust gas exhausted from the pre-heating reactor 23 is supplied to the conveying line L57 through a branched exhaust gas branched line L55. The conveying line L57 is extended vertically, and iron ores and additives are supplied to the conveying line L57 at a location 1~2 m higher than the supply position of exhaust gas. If iron ores and additives are supplied from a location 1~2 m higher than the supply position of exhaust gas, scattering loss of the iron ores and additives occurring during drying and conveying is minimized, and the area of contact with the exhaust gas is maximized such that it is possible to dry and convey the iron ores and additives very efficiently. The supply position of the iron ores and additives from the conveying line L57 shown in FIG. 1 is used for illustrative purposes and does not restrict the invention. Accordingly, it is only necessary that the conditions described above be satisfied.

Iron ores and additives are dried and conveyed by the exhaust gas exiting the exhaust gas branched line L55 that is connected to the lower port of the conveying line L57 to be charged in the rock hopper 21. The amount of exhaust gas branched and used in drying and conveying is preferably 20~40% of the exhaust gas amount exhausted from the fluidized-bed reactors. If this amount of exhaust gas is used, an amount of dried and conveyed iron ores and additives is sufficient to manufacture molten irons.

If iron ores having a grain size of 8 mm or less is used, volume and density are relatively low such that a smooth supply to the rock hopper 21 is possible. Further, a suitable flow speed of the exhaust gas in the conveying line L57 is 10~30 m/s. If the flow speed of the exhaust gas is less than 10 m/s, the pressure at the bottom part of the conveying line L57 increases to destabilize the flow of the exhaust gas. On the other hand, if the flow of the exhaust gas exceeds 30 m/s, scattering loss may occur.

Hence, by using the exhaust gas as a conveying gas of the iron ores and additives and drying the same by the sensible heat of the exhaust gas, the exhaust gas may be recycled to thereby save energy, and drying may be stably realized. Since drying and conveying occur simultaneously in the conveying line L57, the number of different types of equipment used for drying and conveying is significantly reduced. Especially, the amount of iron ores and additives supplied to the conveying line L57 may be adjusted respectively by an iron ore valve V30 and an additive valve V40, and the amount of the exhaust gas supplied to the conveying line L57 may be adjusted by an exhaust gas valve V55.

In the apparatus for manufacturing molten irons according to the first embodiment of the invention, iron ores and additives are selectively supplied to the conveying line L57 according to operating conditions to thereby realize drying and conveying. In the case where additives are supplied to the conveying line L57 to realize drying and conveying, the valve V40 is opened while the valve V30 is closed such that only the additives are dried and conveyed: In this case, the flow speed of the exhaust gas supplied to the conveying line L57 is preferably 10~20 m/s. If the flow speed of the exhaust gas is less than 10 m/s, additives charged to a lower part of the conveying line L57 are not fully transported in the conveying line L57, and some particles are accumulated in the lower part of the conveying line L57. Therefore, a pressure at the lower part of the conveying line L57 is significantly increased such that flow in the conveying line L57 is made unstable. On the other hand, a flow speed of the exhaust gas exceeding 20 m/s is not suitable since the grain size of the additives is too small. Here, the amount of iron ores that is processed is approximately 100~130 tons/day, and the amount of additives processed is approximately 15~30 tons/day.

Further, in the case where iron ores are supplied to the conveying line L57 to be dried and conveyed, the valve V30 is opened while the valve V40 is closed such that only the iron ores are dried and conveyed. In this case, the flow speed of the exhaust gas supplied to the conveying line L57 is preferably slightly greater. As a result of the greater particle size and density of the iron ores compared to the additives, the flow speed of the exhaust gas is preferably 20~30 m/s. As described above, the iron ores and additives may be separately dried and conveyed as in the first embodiment of the invention, or may be mixed then dried and conveyed.

Figure 2:
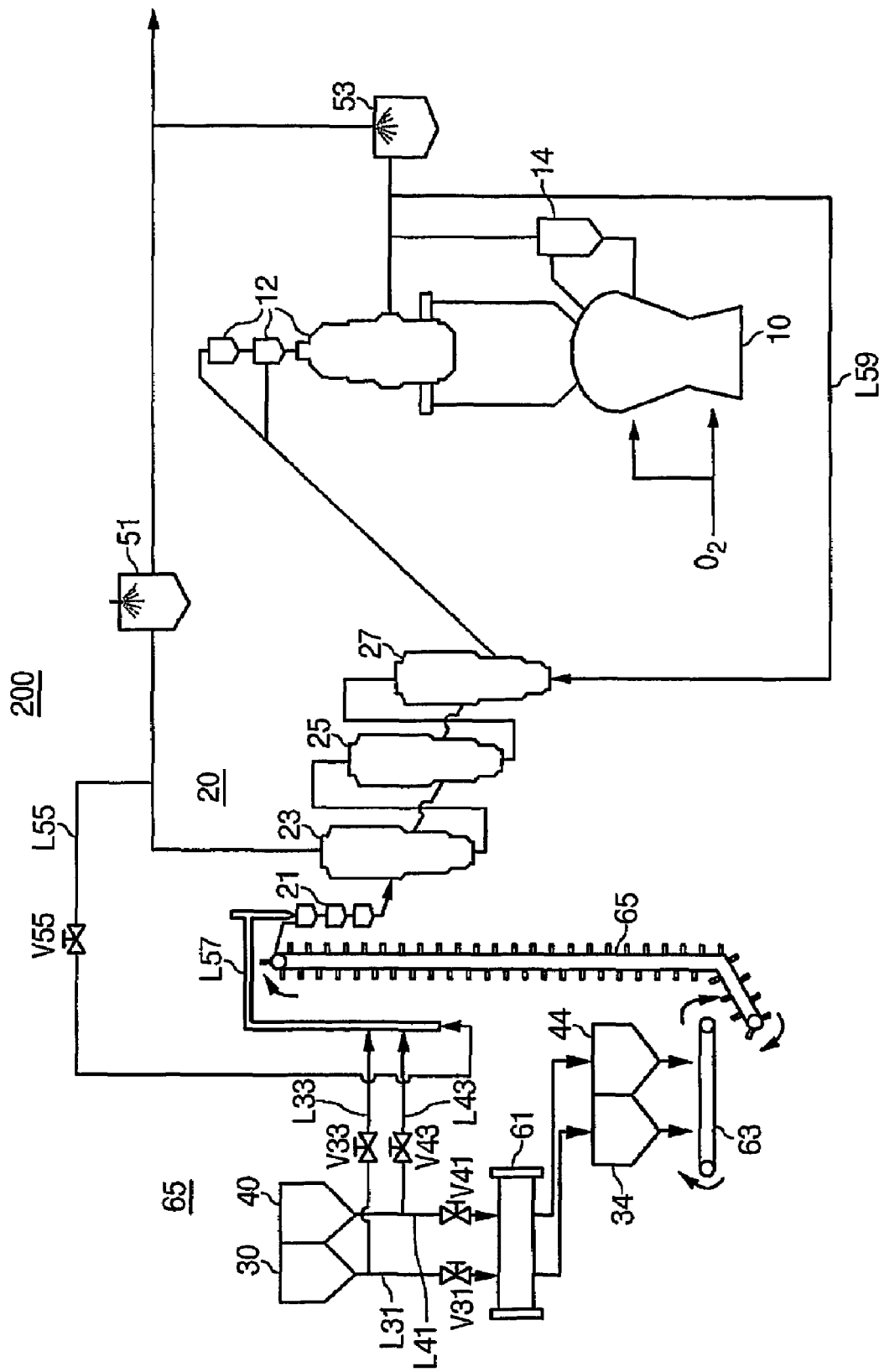
FIG. 2 is a schematic view of an apparatus for manufacturing molten irons according to a second embodiment of the invention.

FIG. 2 is a schematic view of an apparatus for manufacturing molten irons according to a second embodiment of the invention.

An apparatus 200 for manufacturing molten irons according to the second embodiment of the invention shown in FIG. 2 is identical to that of the first embodiment except for a raw material supply unit 65. Accordingly, elements of the apparatus 200 for manufacturing molten irons identical to the elements of the first embodiment will not be described, and the explanation will be concentrated on the raw material supply unit 65.

As shown in FIG. 2, the raw material supply unit 65 includes the iron ore hopper 30, the additive hopper 40, a drying assembly 61, an iron ore storage bin 34, an additive storage bin 44, and conveyor belts 63 and 65.

An iron ore supply line L31 connected to the iron ore hopper 30 and an additive supply line L41 connected to the additive hopper 40 are connected to the drying assembly 61 to supply iron ores and additives thereto. The drying assembly 61 supplies hot air to a lower area of its dispersing plate such that iron ores and additives are dried while being vibrated to a fluidized bed state. Iron ores and additives dried in the drying assembly 61 are stored respectively in the iron ore storage bin 34 and the additive storage bin 44. The dried and stored iron ores and additives are transmitted by the first conveyor belt 63. The first conveyor belt 63 is connected to the vertical second conveyor belt 65 such that the dried iron ores and additives are charged to the rock hopper 21.

The second embodiment of the invention is used by connecting the conveying line L57 to the above apparatus. Iron ores are supplied to the conveying line L57 through an iron ore bypass line L33 connected to the iron ore supply line L31, and additives are supplied to the conveying line L57 through an additive bypass line L43 connected to the additive supply line L41. Accordingly, iron ores and additives are formed into an iron-containing mixture and dried immediately prior to supply to the fluidized-bed reactors having fluidized beds.

Especially, the apparatus 200 for manufacturing molten irons of the second embodiment provides particular convenience by using the bypass lines L33 and L43 when the drying assembly 61 malfunctions or an excessive load is given to the drying assembly 61.

That is, in the case where the drying assembly 61 malfunctions, valves V31 and V41 directed to the drying assembly 61 are closed, while valves L33 and L43 respectively mounted on the bypass lines L33 and L43 are opened such that iron ores and additives are directly supplied to the conveying line L57. Further, the valve V55 is opened such that exhaust gas is supplied to the conveying line L57 through the exhaust gas branched line L55, resulting in drying and conveying iron ores and additives to the rock hopper 21. Accordingly, iron ores and additives are continuously dried and conveyed to enable charging to the fluidized-bed reactors, thereby allowing the manufacture of molten irons to be more flexibly performed.

In the case where a significant load is applied to the drying assembly 61, the valves V33 and V43 are opened in a state where both the valves V31 and V41 directed to the drying assembly 61 are opened such that part of the iron ores and additives supplied to the drying assembly 61 are supplied to the conveying line L57. Therefore, the load applied to the drying assembly 61 is minimized.

The invention will be described in greater detail below through an experimental example. This experimental example merely illustrates the invention and is not meant to limit the invention.

EXPERIMENTAL EXAMPLE

Iron ores and additives of limestone were dried and conveyed through a conveying line. The properties of the iron ores and additives used in this case are as shown in Table 1 below.

TABLE 1

|  | Iron Ores | Additives (Limestone) |
|---|---|---|
| Composition | T. Fe 63.43 wt % | CaO 50.67 wt % |
|  | FeO 0.24 wt % | MgO 2.44 wt % |
|  | $SiO_2$ 3.41 wt % | $SiO_2$ 1.48 wt % |
|  | $Al_2O_3$ 2.04 wt % |  |
| Water content | 5~10 wt % | 5 wt % or less |
| Grain size distribution | 8 mm or less | 4 mm or less |

Among the exhaust gas exhausted from the fluidized-bed reactors, 20~40% was branched and supplied to the conveying line. The details of the exhaust gas supplied to the conveying line are as shown in Table 2 below.

TABLE 2

| Composition | CO 20 vol %, $H_2$ 21 vol %, $CO_2$ 20 vol %, $N_2$ 39 vol % |
|---|---|
| Temperature and Pressure | 680° C., 1.7~20.0 $kgf/cm^2$ |
| Flow rate | 8000~9000 $Nm^3/hr$ |

In the case where iron ores and the additives of limestone are each supplied to the conveying line, the size of the conveying line extended vertically, and the gas flow rate and pressure drops in the conveying line are as shown in Table 3 below.

TABLE 3

|  |  | Inner Diameter 0.2 m, |
|---|---|---|
|  | Size | Height 40.0 m |
| Iron Ores | Gas flow rate | 20~30 m/s |
|  | Pressure drop | 0.30~0.50 $kgf/cm^2$ |
| Additives | Gas flow rate | 10~20 m/s |
|  | Pressure drop | 0.05~0.2 $kgf/cm^2$ |

Results of comparing water content prior to drying and following drying and conveying of the iron ores and additives in the conveying line are shown in Table 4 below.

TABLE 4

|  | Iron Ores | Additives (Limestone) |
|---|---|---|
| Process rate | 100~130 tons/day | 15~30 tons/day |
| Water content prior to drying | 5~10 wt % | 5~6 wt % |
| Water content following drying | 3 wt % or less | 1 wt % or less |

As shown in Table 4, when the iron ores and additives are dried through the conveying line, the amount of water content therein is significantly reduced, thereby indicating that conveying and drying are efficiently realized.

The invention has the advantage of being able to use fine ores and fine additives. That is, by using iron ores and additives of a minimal grain size, these materials may be conveyed and simultaneously dried using exhaust gas.

In the invention, since exhaust gas emitted from fluidized beds are branched and used, the amount of waste gas is reduced and energy may be reused.

In particular, by drying the iron ores and additives immediately prior to supplying the same to fluidized beds, preheating and reduction rates in the fluidized beds are further increased.

Also, since the invention may be applied to general drying assemblies, precautions may be taken against any problems that may occur with the drying assembly and load applied to the drying assembly may be dispersed such that the apparatus for manufacturing molten irons may be more flexibly operated.

A mixture containing iron is reduced using multiple stages of fluidized beds such that a reduction material that has been fully reduced and calcined may be obtained.

Although embodiments of the invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the invention, as defined in the appended claims.

What is claimed is:

1. A method for manufacturing molten irons, comprising:
   providing a mixture containing iron by drying and mixing iron ores and additives;
   passing the mixture containing iron through one or more successively-connected fluidized beds to convert the mixture into a reduced material that is reduced and calcined;
   forming a coal packed bed as a heat source in which the reduced material has been melted;
   charging the reduced material to the coal packed bed and supplying oxygen to the coal packed bed to manufacture molten irons; and
   supplying reducing gas exhausted from the coal packed bed to the fluidized bed,
   wherein
   the mixture is dried and conveyed using branched exhaust gas comprising less than all of the exhaust gas which is exhausted from the fluidized bed and supplied to a conveying line while the mixture is conveyed toward the fluidized bed in the conveying line; and
   the mixture is supplied to the conveying line in substantially the same direction as a supplying direction of the branched exhaust gas to the conveying line to start conveying the mixture in the conveying line.

2. The method of claim 1, wherein in the step of providing a mixture containing iron, at least one of the iron ores and the additives is dried immediately prior to supply to the fluidized bed.

3. The method of claim 2, wherein the step of providing a mixture containing iron comprises the step of:
   discharging stored iron ores and additives;
   drying the iron ores and additives using separate heating air while vibrating the iron ores and additives;
   storing the dried iron ores and additives; and
   supplying the stored iron ores and additives to the fluidized bed.

4. The method of claim 1, wherein in the step of providing a mixture containing iron, an amount of branched exhaust gas is 20~40% of an amount of exhaust gas exhausted from the fluidized bed.

5. The method of claim 1, wherein in the step of providing a mixture containing iron, at least one of the iron ores and the additives is conveyed and simultaneously dried.

6. The method of claim 5, wherein in the step of providing a mixture containing iron, a flow rate of the exhaust gas is 20~30 m/s in the case where the iron ores are conveyed.

7. The method of claim 5, wherein in the step of providing a mixture containing iron, a flow rate of the exhaust gas is 10~20 m/s in the case where additives are conveyed.

8. The method of claim 1, wherein in the step of providing a mixture containing iron, the iron ores are fine ores having a grain size of 8 mm or less.

* * * * *